(No Model.) 10 Sheets—Sheet 1.

W. B. GORDON.
OPERATING ORDNANCE.

No. 497,977. Patented May 23, 1893.

Witnesses
Jas. E. Hutchinson.
G. F. Downing.

Inventor
W. B. Gordon
By H. A. Seymour
Attorney (No Model.) 10 Sheets—Sheet 5.
W. B. GORDON.
OPERATING ORDNANCE.
No. 497,977. Patented May 23, 1893.
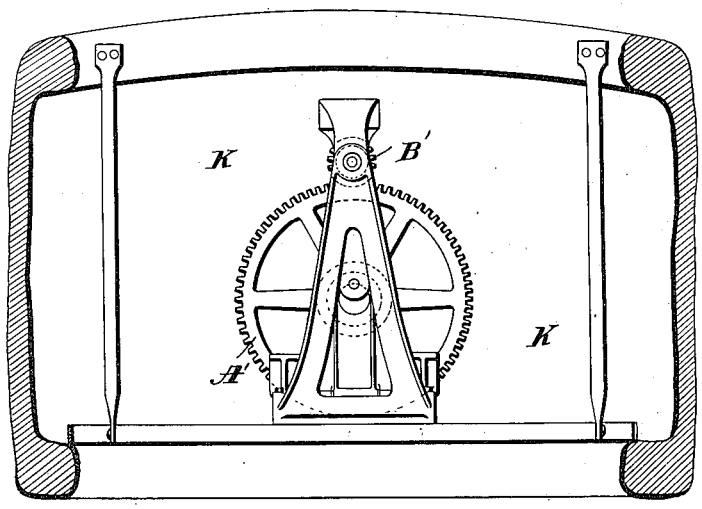
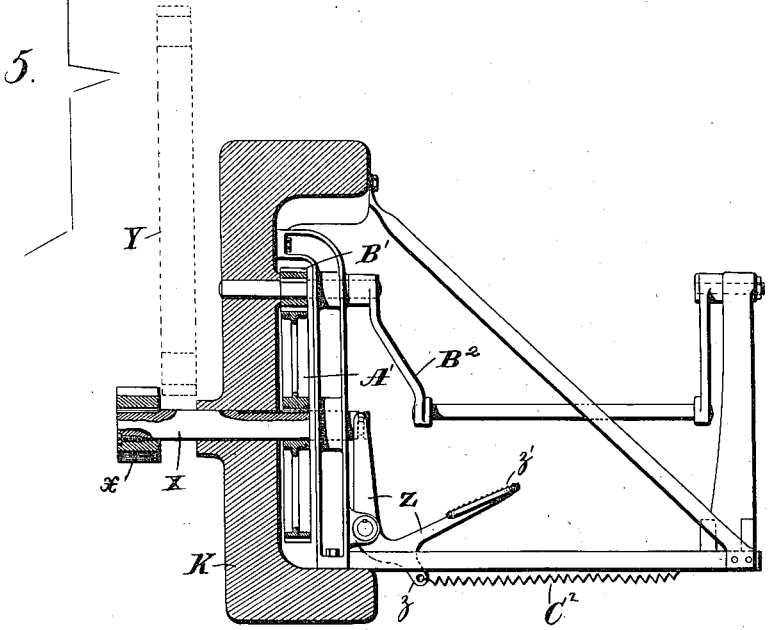
Fig. 5.
Witnesses
Jas. E. Hutchinson
G. F. Downing
Inventor
W. B. Gordon
By H. A. Seymour
Attorney (No Model.) 10 Sheets—Sheet 6.
W. B. GORDON.
OPERATING ORDNANCE.
No. 497,977. Patented May 23, 1893.
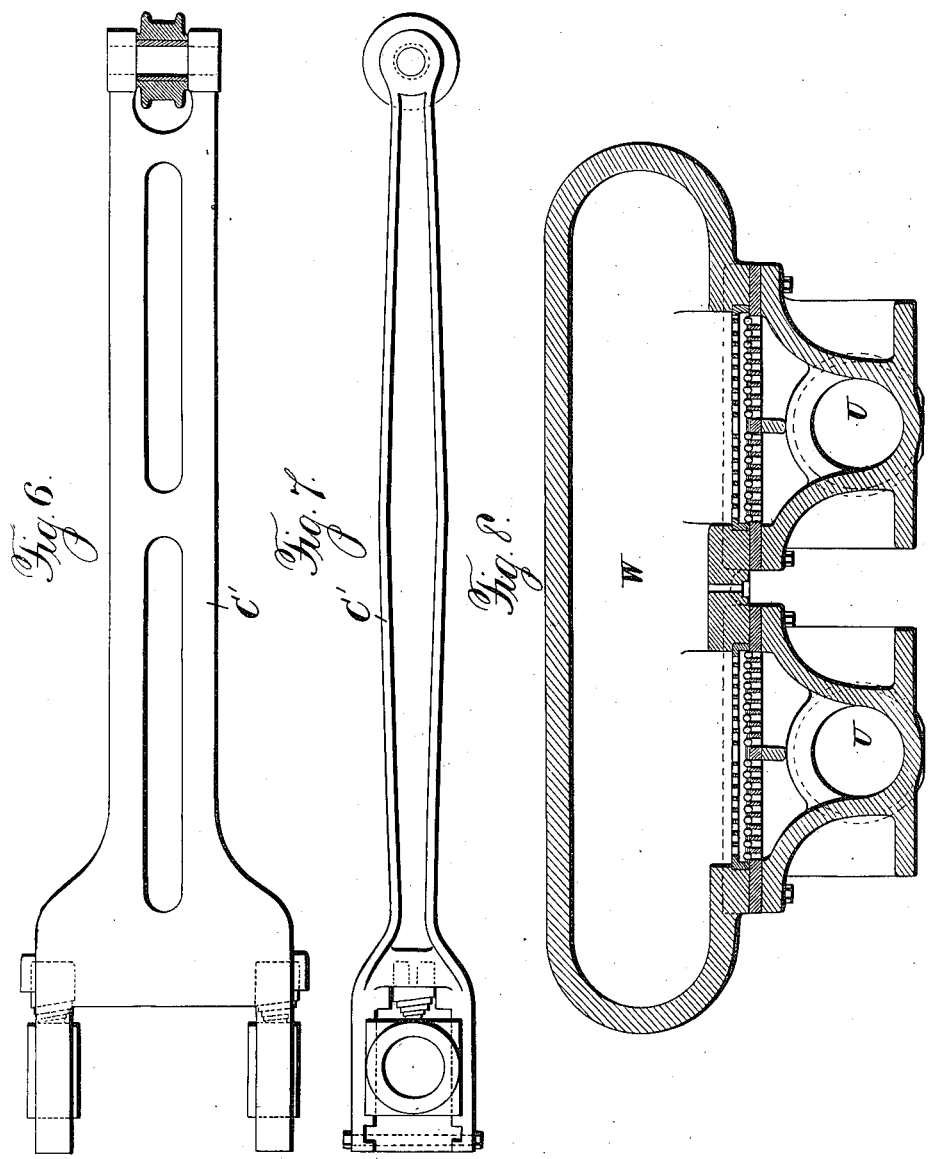
Witnesses
Jas. E. Hutchinson.
G. F. Downing.
Inventor
W. B. Gordon
By H. A. Seymour
Attorney (No Model.) 10 Sheets—Sheet 7.
W. B. GORDON.
OPERATING ORDNANCE.
No. 497,977. Patented May 23, 1893.
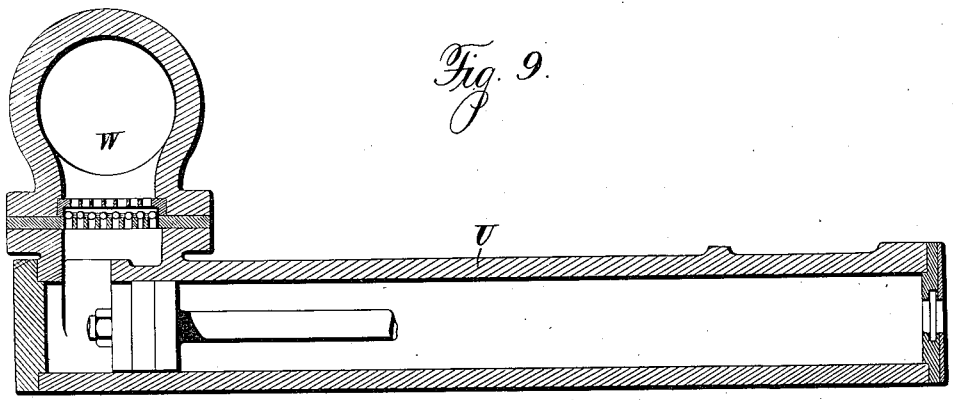
*Fig. 9.*
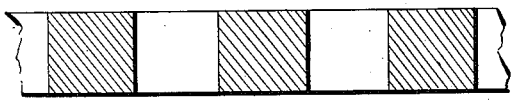
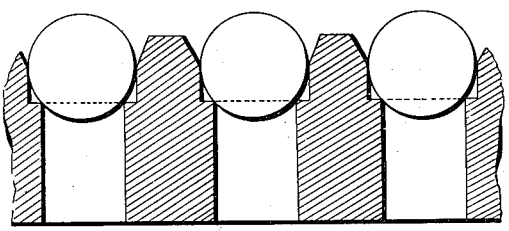
*Fig. 13.*
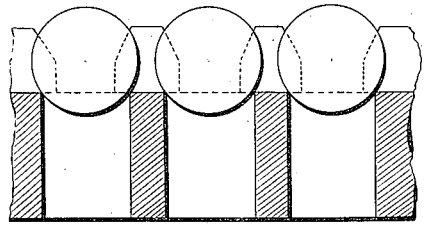
*Fig. 14.*
Witnesses
Jas. E. Hutchinson.
G. F. Downing.
Inventor
W. B. Gordon
By H. A. Seymour
Attorney

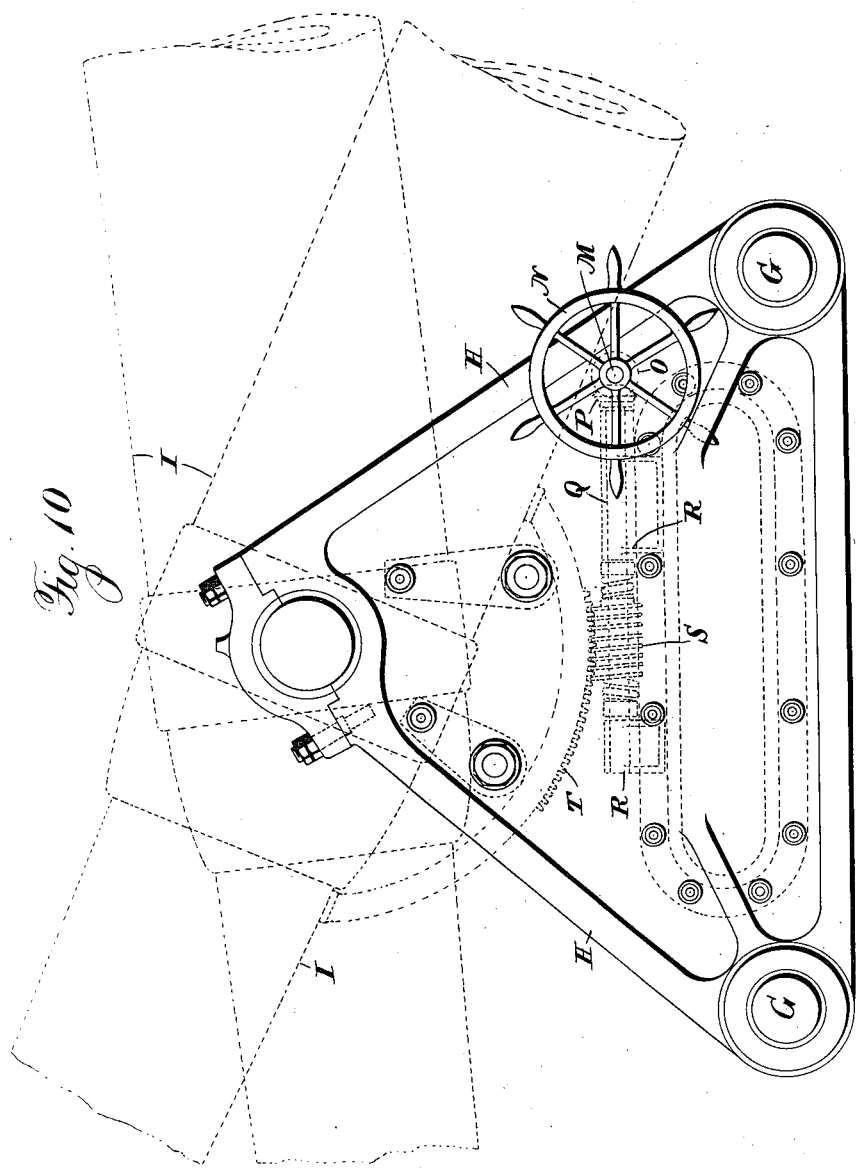

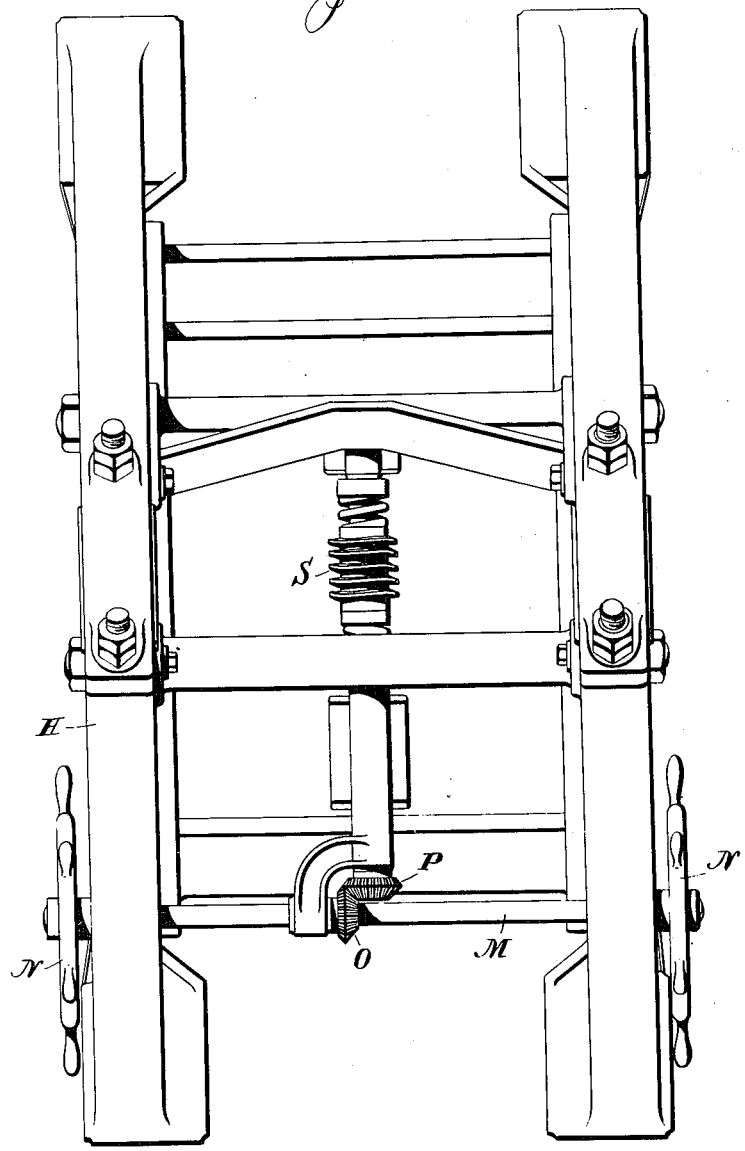

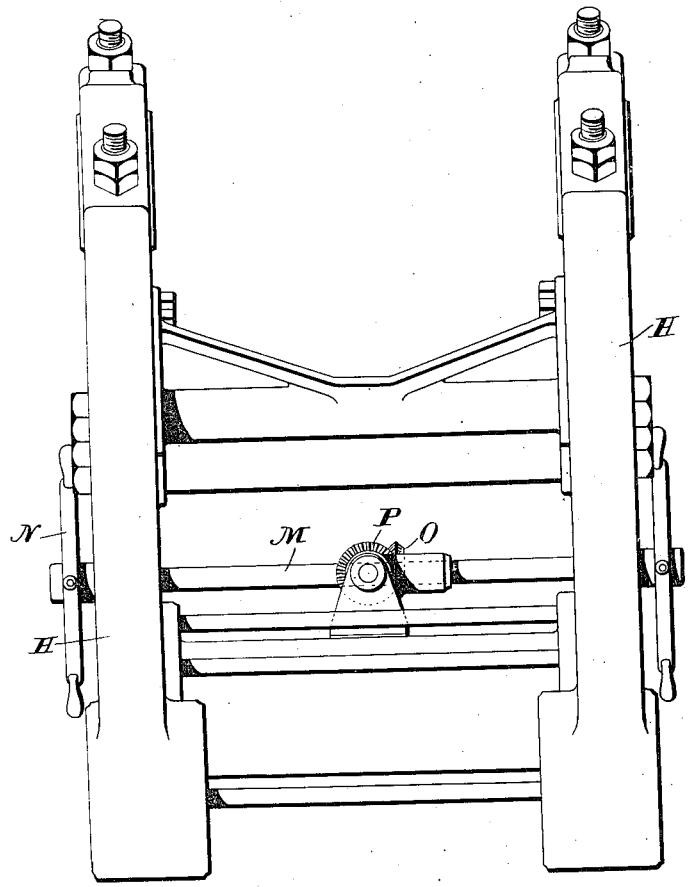

UNITED STATES PATENT OFFICE.

WILLIAM B. GORDON, OF COLD SPRING, NEW YORK, ASSIGNOR OF ONE-HALF TO THOMAS R. MORGAN, SR., OF ALLIANCE, OHIO.

OPERATING ORDNANCE.

SPECIFICATION forming part of Letters Patent No. 497,977, dated May 23, 1893.

Application filed January 25, 1893. Serial No. 459,691. (No model.)

*To all whom it may concern:*

Be it known that I, WILLIAM B. GORDON, captain in the United States Army, residing at Cold Spring, in the county of Putnam and State of New York, have invented certain new and useful Improvements in Disappearing-Gun Carriages; and I do hereby declare the following to be a full, clear, and exact description of the invention, such as will enable others skilled in the art to which it appertains to make and use the same.

My invention relates to an improvement in disappearing gun carriages, and it consists in the parts and combinations of parts as will be hereinafter more fully explained and pointed out in the claims.

Figure 1:
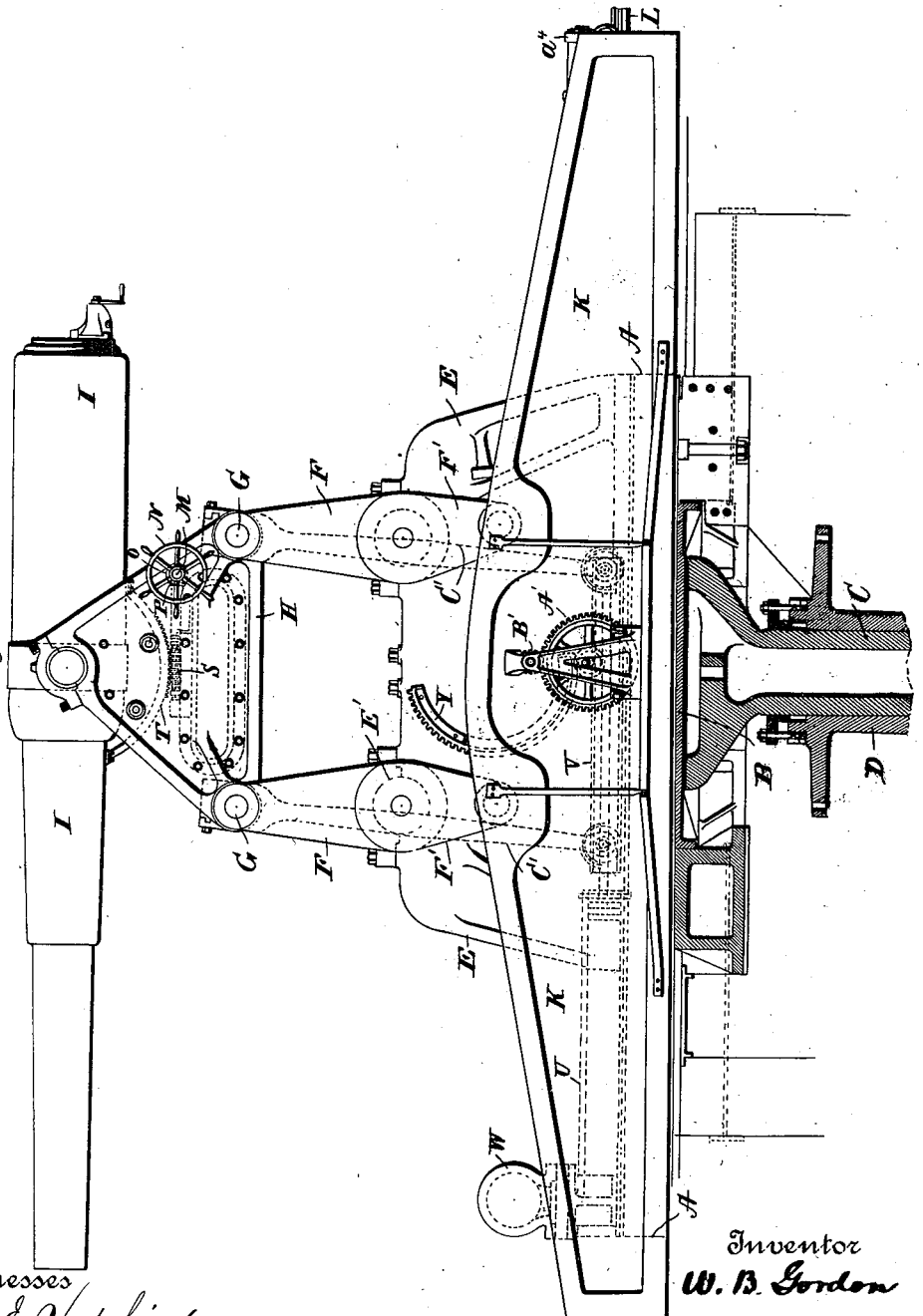
Figure 2:
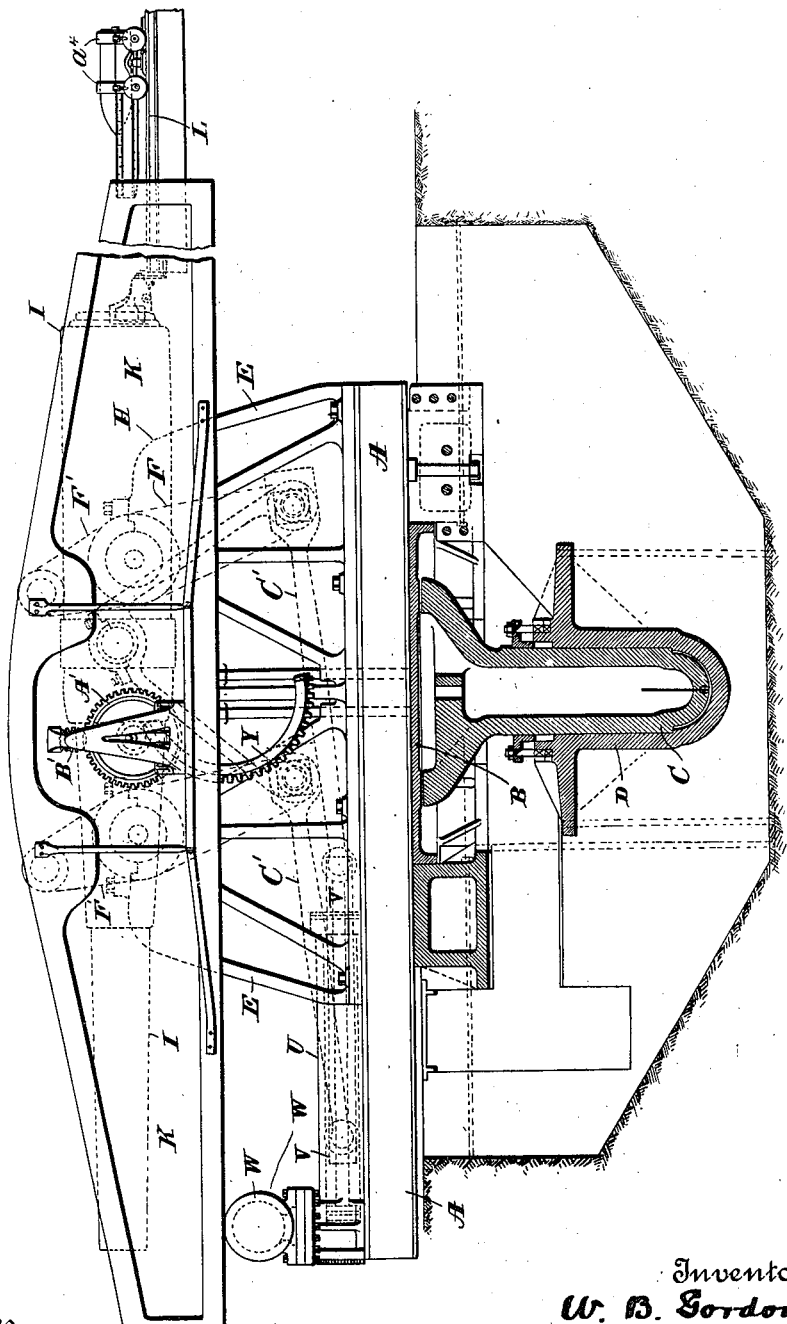
Figure 3:
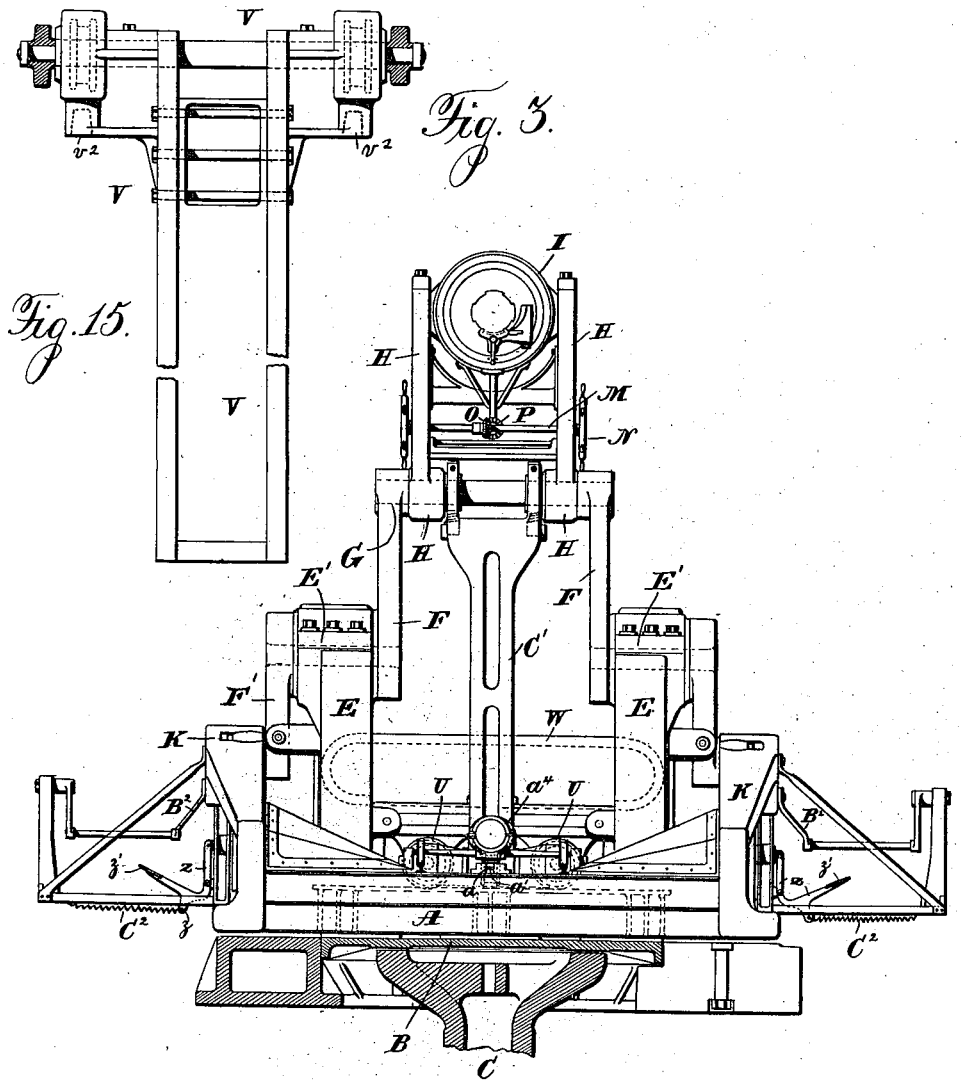
Figure 4:
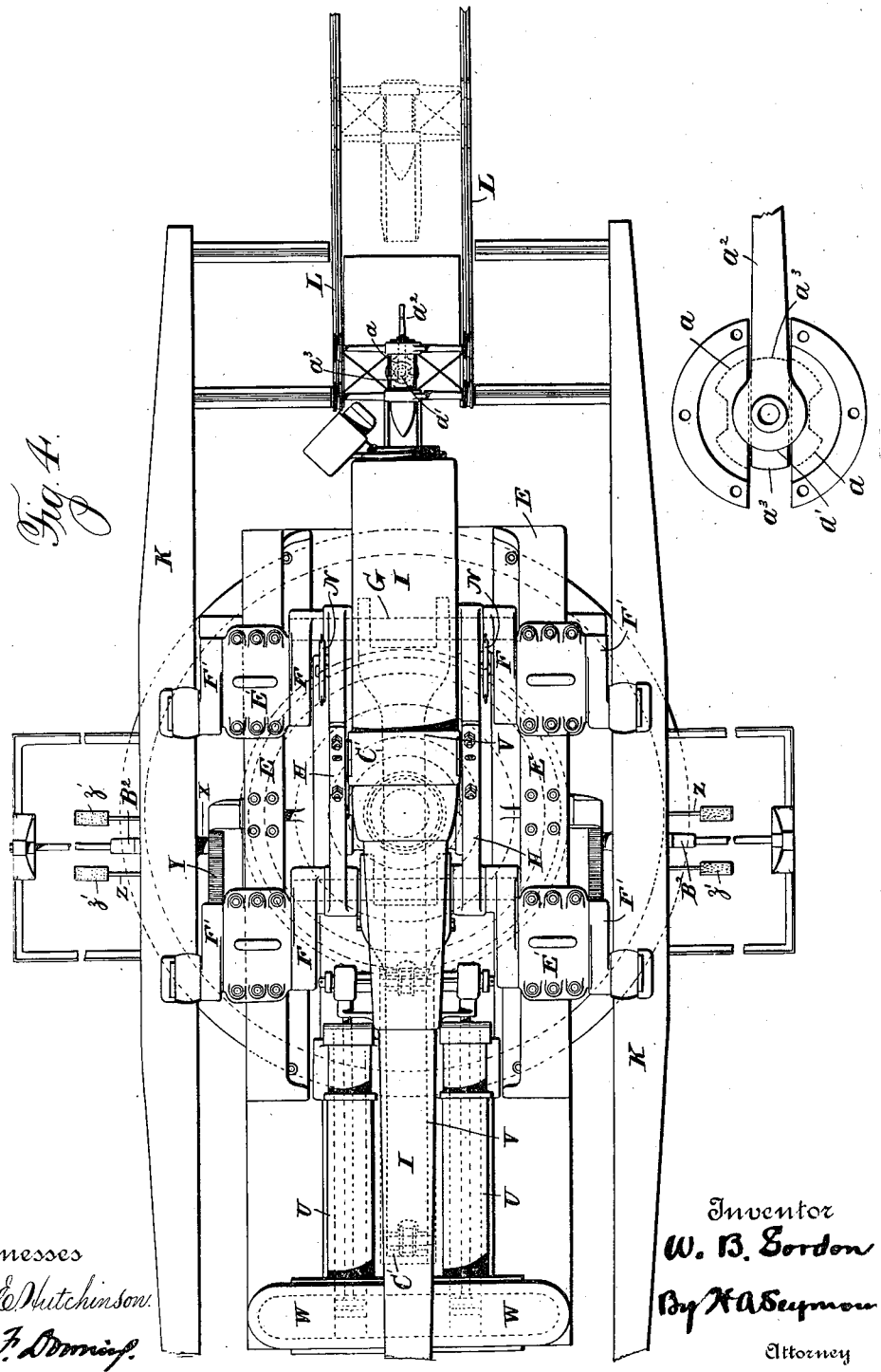

In the accompanying drawings, Figure 1 is a view in side elevation of the gun carriage, showing the gun in its elevated position or in a position for firing. Fig. 2 is a similar view showing the position of the parts after the recoil. Fig. 3 is an end view looking toward the breech of the gun and showing the latter in its elevated position. Fig. 4 is a plan view. Fig. 5 are views of a section of one of the counterweights showing devices for elevating the gun or for assisting in elevating it. Fig. 6 is a view of one of the connecting rods, which connects the top carriage with the devices for taking up the recoil. Fig. 7 is a view in side elevation of same. Fig. 8 is a transverse section of the cylinders showing also the air chamber. Fig. 9 is a view in longitudinal section through one cylinder. Fig. 10 is a view in side elevation of the top carriage. Fig. 11 is a plan and Fig. 12 an end view of same. Figs. 13 and 14 are views of the valve between the air chamber and cylinders, and Fig. 15 is a plan view of the truck to which the pistons and connecting rods are attached.

A represents a base or bed plate constructed in any desired manner and rigidly fastened to a pivot plate B which latter is carried by the hydraulic plunger C for traversing. This plunger rests in cylinder D and can be elevated carrying with it the pivot plate B and the gun carriage thereon. When in this elevated position the carriage rests on the hydraulic pivot thus formed and the traversing can be readily and quickly accomplished. After the carriage has been turned to the desired position the pivot plate is lowered into the platform and the carriage to its bearings on the traverse circle, and the plunger allowed to descend until out of contact with the pivot plate.

From the foregoing it will be seen that the hydraulic elevating devices receive no shock from the recoil and hence are not liable to be injured when firing.

The side frames E of the carriage are permanently fastened to the bed plate A, and each is provided on its upper edge with bearings E' in which are mounted the crank arms. These arms are arranged parallel, two to a side and are connected at their upper ends to shafts G which pass through the cheek pieces H of the top carriage. The top carriage is composed of two cheek pieces H rigidly braced a suitable distance apart to receive the gun between them, each piece having trunnion bearings for the reception of the trunnions of the gun I. The shafts G pass through the top carriage from side to side and are journaled therein, one in front and one in the rear, and are rigidly fastened at their outer ends to the parallel arms F of the crank arms. These arms are each in effect two cranks, the inner cranks F which as clearly shown are located in planes inside the inner faces of the side frames, and support the top carriage, and the outer cranks F' rest on the outside of the side frame and support the counterweights K, which latter counterbalance the weight of the gun. The four parallel crank arms are as before stated journaled in the side frames E of the lower carriage, and as they are connected at their upper ends to the upper carriage and at their lower ends to the counterweights, it follows that when the upper carriage with the gun thereon is rising the counterweights are descending and vice versa. The counter-weights K are preferably transomed together forming a rectangular frame, the transoms being near the ends of the weights so as not to interfere in the least with the movable parts carrying the upper carriage. The rear transom forms a loading platform, and is provided with a trackway L on which the loading truck runs. This truck carries the charge to the breech of the gun when the latter is in its depressed position occasioned by the recoil, and is provided at its front end with a tray adapted to enter the breech and protect the threads thereof from injury in loading. The transom is provided with a split casing having a recess $a$ therein adapted to receive the head $a^3$ on the post $a'$ carried by the under side of the truck. This head is narrower than the split or recess in the casing so that when in its normal position it can pass through said casing but by turning the post by means of handle $a^2$ the head $a^3$ which is longer than it is wide enters the recess and locks the truck against displacement.

The truck body is curved to conform to the contour of the charge, and is provided with the semi-cylindrical bands which latter are adapted to lock the charge to the truck. These bands are pivoted each at one end to the truck, and when placed over the charge can be locked at their free ends. By thus clamping the truck to the rear transom and locking the charge in the truck, the charge is lifted to the loading position by the recoil of the gun.

I have described the counter-weights connected by one or more transoms to suit convenience as to space available, but I do not confine myself to such a construction or arrangement, as the counterweights may have no other connection but the pivoted levers or crank arms.

From the foregoing it will be seen that the carriage as thus far described consists of a bed plate mounted on a hydraulic pivot for traversing and carrying a main carriage or side frames, parallel crank arms journaled in said side frame, counterweights each carried by two arms, and a top carriage carried by the four arms, so that as the gun and top carriage move rearwardly and downwardly from the effect of the recoil, the counterweights move forwardly and upwardly, until they come to a rest. When in this latter position the gun is in its lowermost position, or in its position for loading, and the counterweights are in their elevated position, and hence in a position to raise the gun or assist in raising it to its firing position.

The gun is mounted on the top carriage and moves with it in recoil without change of elevation, the top carriage, being provided with an elevating device, to be now described, which is independent of any other part of the carriage.

The top carriage as before described consists of two cheek pieces rigidly secured a suitable distance apart for the reception of the gun between them. The front and rear lower ends of the carriage thus formed are mounted on the shafts carried by the crank arms F. Passing transversely through the top carriage near the rear end of the latter is a shaft M provided at its ends with hand wheels N. This shaft is provided at a point between the cheeks of the top carriage with a miter wheel O which latter meshes with a similar wheel P on worm shaft S mounted in bearings attached to the top carriage. The worm meshes with the segment gear T secured at its ends to the under side of the gun. By this arrangement it will be seen that the elevating devices are wholly on the top carriage and consequently totally independent of any other part of the system.

The device for taking up the recoil consists of two hydropneumatic cylinders U secured to the bed plate of the system each provided with a piston and piston rod, the forward or outer ends of the latter engaging the front end of a truck V (see Fig. 15) which will be explained later on. These cylinders are parallel but are separated sufficiently for the entrance of truck V between them and are in communication at their rear ends with the air chamber W which latter contains air under pressure. Between the cylinders and air chamber are a series of valves, which in the present instance are ball valves shown in Figs. 13 and 14 but which can be of any variety whatsoever, that will open to permit of the passage of the water from the cylinders to the air chamber when the pistons are moving toward the latter and will retain the water under pressure therein, the water being released from the air chamber by a by-pass leading from the chamber to the cylinders. The pressure within the air chamber opposes the motion of the pistons and when the water has been forced into the air chamber it is necessarily under a high pressure and serves when released to assist the counterweights in restoring the gun to its position for firing. The chamber W is also connected to the cylinders by by-pass for conveying the water back behind the pistons thus forcing the latter out and assisting the counterweights as before stated in elevating the gun. The two pistons are connected at $v^2$ to the truck or cross head V and the cross head or truck is provided at its rear end with two wheels which run on rails permanently fastened to the bed plate. Journaled to the truck or cross head at the rear end thereof is the connecting rod C'. This rod is journaled on the steel shaft carrying the flanged wheels of the truck or cross head and is provided at its lower end with a flanged wheel adapted to traverse a central rail, and is journaled at its upper end to the shaft supporting the rear end of the top carriage. The front end of the truck is supported by and mounted on lower end of a connecting rod C', which latter is also provided at its lower end with a flanged wheel adapted to run on the central rail, and is journaled at its upper end to the shaft G supporting the front end of the top carriage H.

In Fig. 1, I have shown the gun in its firing position and the cross head or truck V in a position immediately below the top carriage. As the charge is fired the gun begins to move rearwardly and downwardly and necessarily elevating the counterweights. As the top carriage begins to descend, the connecting rods move the truck forwardly between the cylinders, and consequently force the fluid contained in the cylinders into the air chamber, and by the time the pistons have reached the end of the stroke the gun and counterweights have moved to the loading position. During the recoil, the system rotates about the journals of the parallel cranks, the loading position being as nearly as may be, directly under the firing position, thus securing the maximum amount of cover. The recoil stores energy in the air chamber for returning the gun to the firing position, but I provide an independent mechanism attached to the counterweight for maneuvering either by hand or by power. This mechanism consists of a segment gear Y attached to each side frame of the main carriage, and a series of gear wheels carried by the counterweights and adapted to mesh with the segmental gears on the side frames. A simple form of gearing is shown in Fig. 5. As the gearing on both sides is alike a description of one will suffice for both. This gearing consists of a sliding shaft X having thereon a toothed wheel $x$ which latter is adapted to mesh with the segment Y fast to the side frame E. Secured to the outer end of shaft X is one arm of the bell crank lever Z. This lever is pivoted to a bracket and is provided at the end of its other arm with a foot rest. The lever is also provided with a depending projection $z$ to which a strong spring is attached the object of the latter being to hold the foot rest elevated and the toothed wheel $x$ out of contact with the segment. This is the position of the parts just before firing and during the recoil.

Mounted on the sliding shaft X is the toothed wheel A' which latter engages the smaller toothed wheel B' carried by crank B². From the foregoing it will be seen that by turning the crank motion is imparted through wheel B' to wheel A' and from thence to shaft X and wheel $x$. After the recoil the gun is in its lowered position for loading and the counterweights are elevated. Now if it should be desired or necessary to assist the hydro-pneumatic devices and counterweights in restoring the gun to its firing position, or if it should be necessary to restore the parts without assistance from the hydro-pneumatic device, the foot rest $z'$ is depressed which action moves the shaft longitudinally and brings toothed wheel $x$ into engagement with segment Y. By now turning crank B² the counterweights are lowered and the gun elevated to the position for firing. As soon as the foot rests are released the springs C² force the vertical arm of bell crank lever Z inwardly and move the shaft X with the wheel thereon until the latter is out of engagement with the segment.

It is evident that the gearing just described for elevating the gun may be considerably modified and that a motor may be employed for actuating the gearing. I also employ an air pump for forcing air into the water chamber and a pump or pumps for supplying water to the several cylinders but these parts can be of any desired form and construction and form no part of my present invention. I would also have it understood that I do not confine myself to details but consider myself at liberty to make such changes, alterations and additions as fairly fall within the spirit and scope of my invention.

Having fully described my invention, what I claim as new, and desire to secure by Letters Patent, is—

1. The combination with two pairs of pivoted arms, of a top carriage for a gun, the said carriage supported upon the upper ends of said pivoted arms and counterweights carried by the opposite ends of said arms.

2. The combination with two pairs of crank arms journaled at points between their ends, of a top carriage for a gun, the said carriage mounted on the upper ends of said arms and counterweights carried by the lower ends of said arms.

3. The combination with side frames and two pairs of crank arms journaled therein at points between their ends, of a top carriage for a gun, the said carriage mounted on the upper ends of said arms and counterweights carried by the lower ends thereof.

4. The combination with crank arms journaled in side frames at points between their ends, of a top carriage mounted on the upper ends of said arms, counterweights carried by the lower ends thereof, and gun elevating devices carried by the top carriage.

5. The combination with a top carriage and counterweights connected therewith by intervening devices and side frames for supporting said parts, of gun elevating devices carried by the top carriage.

6. The combination with side-frames and crank arms journaled therein at points between their ends, of an upper carriage carried by the upper ends of said crank arms, counterweights carried by the lower ends of said arms, and transoms connecting the counterweights.

7. The combination with side frames and crank arms journaled therein, of shafts secured to the upper ends of the crank arms, a top carriage mounted on said shafts, and counterweights carried by the lower ends of said crank arms.

8. The combination with side frames crank arms journaled therein, a top carriage mounted on the upper ends of said arms and counterweights carried by the lower ends thereof, of segment gears on the side frame and gearing carried by the counterweights and adapted to engage the segment gears on the side frames, substantially as and for the purpose set forth.

9. The combination with side frame, crank arms journaled therein a top carriage mounted on the upper ends of said arms and counterweights carried by the lower ends thereof, of segment gear secured to the side frame, a sliding toothed wheel adapted to be shifted to engage said segment gear, and gearing for actuating said sliding toothed wheel, substantially as set forth.

10. The combination with side frames crank arms journaled therein, a top carriage mounted on the upper ends of said arms, and counterweights adapted to counterbalance the gun and top carriage in all their positions, of segment gear secured to the side frame, a sliding toothed wheel adapted to be shifted to engage said segment gear, means for rotating said sliding toothed wheel, and means for normally holding the latter out of engagement with the segment gear, substantially as set forth.

11. The combination with side frames, crank arms journaled therein, a top carriage mounted on said side arms and counter-weights adapted to counterbalance the gun and top carriage in all their positions, of a loading platform carried by the counterweights.

12. The combination with side frames, crank arms journaled therein, a top carriage mounted upon the upper ends of said arms and counter-weights adapted to counterbalance the gun and top carriage in all their positions, of a loading platform carried by the counterweights and a loading truck on said platform.

13. The combination with side frames a top carriage and connected counterweights adapted to counterbalance the gun and top carriage in all their positions, of a loading platform carried by the counterweights, a truck on said loading platform and means for locking the truck to said platform.

14. The combination with side frames a top carriage and connected counterweights adapted to counterbalance the gun and top carriage in all their positions, of a loading platform carried by the counterweights, a truck on said loading platform, means for locking the truck to said platform and means for locking the charge to the truck, substantially as set forth.

15. The combination with a bed plate and hydraulic devices for elevating same, of side frames on the bed plate, a top carriage and connected counterweights carried by said side frames, the said counterweights adapted to counterbalance the gun and top carriage in all their positions, substantially as set forth.

16. The combination with a bed plate and devices for elevating same for traversing, of side frames on said bed plate and a top carriage and connected counterweights carried by said side frames, substantially as set forth.

17. The combination with side frames, crank arms journaled therein, a top carriage carried by said arms, and counterweights adapted to counterbalance the gun and top carriage in all their positions, of a cylinder containing a resistance medium, a piston in said cylinder and means connecting the piston and top carriage whereby as the top carriage descends the piston is moved against the resistance medium, thus compressing same, substantially as set forth.

18. The combination with side frames, crank arms journaled therein, a top carriage carried by said arms and counterweights adapted to counterbalance the gun and top carriage in all their positions, of cylinders, an air chamber connected therewith, pistons in said cylinders, and means connecting the top carriage with said pistons, substantially as set forth.

19. The combination with side frames, crank arms journaled therein, a top carriage mounted on said arms, and counterweights adapted to counterbalance the gun and top carriage in all their positions, of two cylinders, a connected air chamber, valves between the cylinders and air chamber, pistons and piston rods, a truck connected to said rods, and connecting rods connecting the truck and top carriage, substantially as set forth.

20. The combination with side frames, crank arms journaled therein, a top carriage mounted on said arms, and counterweights adapted to counterbalance the gun and top carriage in all their positions, of cylinders, pistons and piston rods therein, an air chamber communicating with said cylinders, a truck mounted on wheels and connected to the piston rods, and rods connecting the truck and top carriage, substantially as set forth.

In testimony whereof I have signed this specification in the presence of two subscribing witnesses.

WILLIAM B. GORDON.

Witnesses:
W. A. LADEN, Jr.,
D. W. HARKNESS.